Patented June 23, 1953

2,643,265

UNITED STATES PATENT OFFICE 2,643,265

BIS (DIALKYL PHOSPHATE) ESTERS OF ALKYLIDENE DIPHENOLS

Arthur Dock Fon Toy, Park Forest, Ill., assignor to Victor Chemical Works, a corporation of Illinois No Drawing. Application September 15, 1950, Serial No. 185,174

10 Claims. (Cl. 260—461)

This invention relates to the bis(dialkyl phosphate) esters of alkylidene diphenols, and particularly to such esters of alkyl substituted methylene diphenol compounds.

The new compounds of this invention may be represented by the following formula $$(RO)_2\overset{O}{\underset{\|}{P}}-O-R'-\underset{\underset{Z}{|}}{\overset{Y}{\underset{|}{C}}}-R'-O-\overset{O}{\underset{\|}{P}}(OR)_2$$

in which each R is an alkyl group of from 1 to 8 carbon atoms, each R' is either an unsubstituted benzene nucleus or a chlorine substituted benzene nucleus, Y and Z are the remnants of a

condensation. In the preferred compounds each of Y and Z are either a hydrogen atom or an alkyl group, and the preferred alkyl groups contain from 1 to 4 carbon atoms. Preferably at least one of Y and Z is an alkyl group. These compounds, which are useful as plasticizers, may be prepared as follows:

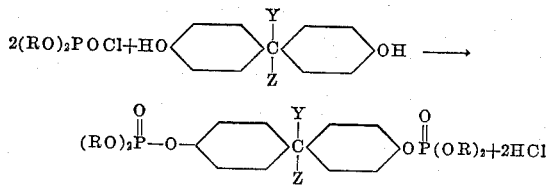

The dihydroxy reactant may be prepared in a condensation reaction as follows:

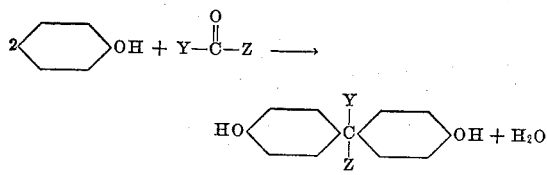

As the functional groups of the diphenol compound that enter into the reaction are only the two end hydroxyl groups, Y and Z may be the remnants of any

condensation. It is readily apparent that

may be either an aldehyde or a ketone.

The compounds of this invention may be prepared, as indicated above, by reacting approximately two mols of a dialkyl chlorophosphate containing one to eight carbon atoms in each alkyl chain with one mol of a suitable methylene diphenol compound. An alkali metal salt (diphenolate) of the diphenol compound may be employed if desired.

As methylene diphenol compounds, in turn, are prepared by condensing essentially one mol of a ketone, or aldehyde, with two mols of a phenol, the size and type of alkylidene group which they may contain is only limited by the commercially available reactive ketones and aldehydes. Dimethyl ketone condensed with phenol yields dimethyl methylene diphenol, hereafter referred to as isopropylidene diphenol. Ethyl methyl ketone, diethyl ketone, propyl ketone, butyl ethyl ketone, and acetaldehyde upon condensation with phenol yield 2-butylidene diphenol, 3-pentylidene diphenol, 2-hexylidene diphenol, 3-heptylidene diphenol, and ethylidene diphenol, respectively.

The preferred phenol ketone, or aldehyde, condensation products which may be used in preparing the diphosphate esters of this invention include the condensation products of phenol with ketones ranging from acetone to dibutyl ketone, i. e. ketones having from one to four carbon atoms in the alkyl chain on either side of the keto carbon, and the condensation products of phenols with aldehydes ranging from formaldehyde to valeraldehyde.

Such above phenol ketone, or phenol aldehyde, condensation products may be reacted with chlorine to yield aromatic nuclei chlorine substituted diphenols useful as intermediates for the preparation of the chlorine-containing diphosphate esters of this invention. For example isopropylidene diphenol is readily chlorinated to yield 2,6,2'6' isopropylidene tetrachlorodiphenal, which when reacted with dibutyl chlorophosphate yields the bis(dibutyl phosphate) ester of 2,6,2'6' tetrachloro isopropylidene diphenol.

To produce the esters of this invention I react essentially two mols of a dialkyl chlorophosphate containing one to eight carbon atoms in each alkyl group with a suitable phenol-ketone, or aldehyde, condensation product, which product may or may not contain chlorine substituents in the aromatic nuclei, or with the respective alkali metal salts (diphenolates) thereof. When a diphenol compound is one of the reactants a tertiary amine is used as a hydrogen chloride acceptor. The reaction is represented by the following equation, using pyridine as the amine:

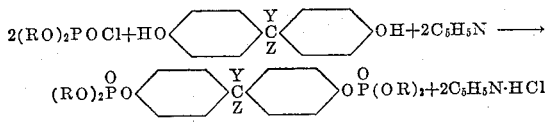

in which R, Y, Z and the aromatic nuclei are as described and limited above. When an alkali metal salt of the diphenol is used no tertiary amine is necessary.

As the diphenol compounds and their respective alkali metal salts are generally solid substances, it is advantageous to dissolve or suspend them in an inert organic solvent or diluent to facilitate the reaction. Organic liquids suitable for this purpose are ether, carbon tetrachloride, monochlorobenzene, heptane and the like.

The reaction between the dialkyl chlorophosphate and the diphenol compounds or their metallic salts including the chlorinated diphenols, is allowed to proceed at room temperatures or above, preferably in the presence of an organic solvent. The reaction may be brought substantially to completion by final heating at an elevated temperature. There is formed a slurry containing the diphosphate ester product, and solid by-product chloride salt. The chloride salt may be removed from the diphosphate ester and organic solvent by filtration, or alternately water may be added to the slurry to dissolve the salt and the water-insoluble organic solvent and product layer separated. The product is recovered by distilling off the organic solvent.

The bis(dialkyl phosphate) esters of alkylidene diphenols of this invention, i. e. those esters containing 1 to 8 carbon atoms in each alkyl group attached to the phosphorus atom, are liquid or solid compounds useful as plasticizers, solvents, oil additives, and the like. Desirable features of a plasticizer are compatibility, low volatility, low temperature flexibility, good flame resistance, low solvent extraction, and low cost. Few commonly used plasticizers have all of the desired properties. For example, tricresyl phosphate lacks low temperature flexibility. Trioctyl and trinonyl phosphates lack compatibility with cellulose acetate, and triethyl phosphate lacks low volatility characteristics. The esters of this invention are superior in having a combination of the above desired characteristics. The alkyl groups impart low temperature flexibility, the aryl groups impart flame resistance, and the four alkyl groups render the compound more generally compatible. The diphosphate esters whose aromatic nuclei each contain two chlorine atoms are generally crystalline compounds and impart exceptional fire resistance to polymers plasticized therewith. Because of the high molecular weight and low volatility of these compounds, the lower alkyl diphosphate esters of my invention, i. e. the methyl through butyl esters may be advantageously employed where such commercial plasticizers as triethyl through tributyl phosphates are not satisfactory.

Plasticizer tests were carried out using compounds of this invention as plasticizers for several commercial resins as cellulose acetate, ethyl cellulose, nitro cellulose, and Vinylite VYNS. Vinylite VYNS is a resin of copolymerized vinyl chloride and vinyl acetate. As solvents, acetone was used for the cellulose acetate, toluol and ethyl alcohol for ethyl cellulose, a mixture of ethyl methyl ketone, butyl acetate, ethyl alcohol and toluol for nitrocellulose, and methyl ethyl ketone for the Vinylite resin. A solution of the resin, plasticizer and solvent was prepared and a film drawn out. The film was allowed to dry at room temperature so that the solvent volatilized. The film was then dried at 105° C. for 22 hours to determine the degree of volatility of the plasticizer. Compounds of this invention imparted fire resistant properties to the plasticized product, had a low volatility, showed no signs of spewing, and were compatible with the resins tested including cellulose acetate. On the other hand a commercial plasticizer, as trioctyl phosphate, was not found to be compatible with cellulose acetate.

Examples of the esters of this invention and their preparation are as follows:

*Example 1*

22.8 g. (0.1 mole) of isopropylidene di(p-phenol) and 34.5 g. (0.2 mole) of diethyl chlorophosphate were dissolved in 150 cc. ether. 22 g. (0.218 mole) of triethylamine dissolved in 50 cc. of ether was added, causing the temperature to rise to 34° C., and then the mixture was refluxed for three hours to complete the reaction. The mixture was cooled and washed several times with water to dissolve the triethylamine hydrochloride salt. The product layer was separated and dried with magnesium sulfate. The magnesium sulfate was filtered out and the solvent was removed by heating to 100 C. at 1.5 mm. pressure. The crude product, the bis(diethyl phosphate) ester of isopropylidene diphenol, weighed 40.9 g. (82% yield). The product is a clear liquid with a refractive index of 1.5108. It analyzed 12.2% P compared to a calculated value of 12.4% P.

*Example 2*

To 22.8 g. (0.1 mol) of isopropylidene di(p-phenol) and 45.7 g. (0.2 mol) of dibutyl chlorophosphate dissolved in 200 cc. ether, there was added 21.5 g. (0.213 mol) of triethylamine dissolved in 25 cc. of ether. The temperature rose to 35° C., and the mixture was heated to 37–39° C. at reflux for six hours to complete the reaction. It was cooled and filtered. The filtrate was washed with 200 cc. absolute ether. The ether was removed by heating to 100° C. at 10 mm. pressure. The few crystals which precipitated were removed by filtration through a sintered glass crucible. The crude material, the bis(dibutyl phosphate) ester of isopropylidene diphenol, weighed 52.2 g. (85.4% yield). It has a refractive index of 1.4985 at 25° C.

*Example 3*

To 8 g. (0.2 mol) of sodium hydroxide dissolved in 100 cc. water there was added 22.8 g. (0.1 mol) of isopropylidene diphenol. Solution occurred readily. Excess water was removed by distillation under reduced pressure, and ultimately by azeotropic distillation with chlorobenzene. The sodium salt was slurried in 100 cc. of chlorobenzene solvent, and 46.5 g. (0.203 mols) of di-n-butyl chlorophosphate added. An exothermic reaction took place. The temperature was maintained at 35–38° C. during the addition. The mixture was allowed to react at above 30° C. for one hour, and heated at 45–50° C. for two hours. The reaction mixture was filtered, and solvent removed from the filtrate by distillation at reduced pressure up to 100° C. at 3–4 mm. The residue, the bis (dibutyl phosphate) ester of isopropylidene diphenol, weighed 52.3 g. (95.9% yield). The product is a reddish amber liquid having a specific gravity of 1.0950 at 25° C., and analyzing 10.1% P.

*Example 4*

To a dry slurry of isopropylidene di(2,6,2'6' tetrachloro p-sodium phenylate) in monochlorobenzene (prepared from 8 grams sodium hydroxide and 36.6 grams of isopropylidene diphenol) there was added 36.5 g. (0.211 mol) of diethyl chlorophosphate over a period of 20 minutes. An exothermic reaction continued for 25 minutes and then the mixture was heated at 45 to 50° C. for one hour to complete the reaction. The mixture was cooled, and 150 cc. of water was added. The product layer was separated and heated to 50° C. at 3 mm. to remove the solvent. A gummy solid was obtained which could be crystallized from cold heptane. The dry crystalline powder obtained amounted to 47 g., an overall yield of 73.6%. The crystals are soluble in alcohol, carbon tetrachloride, benzene, and acetone and melted at 93 to 94° C. An analysis showed 9.7% P, 22.5% Cl. The product is bis(diethyl phosphate) ester of 2,6,2'6' tetrachloroisopropylidene diphenol.

*Example 5*

To a slurry of the chlorinated sodium salt of isopropylidene diphenol, prepared from 0.1 mol of the corresponding diphenol compound and 0.2 mol sodium hydroxide, in 150 cc. chlorobenzene, there was added 47 g. (0.205 mol) di-n-butyl chlorophosphate. The temperature was maintained at 44–50° C. during addition, and then raised to 55–60° C. for one hour. The mixture was filtered to remove the sodium chloride. The filtrate was heated under reduced pressure to remove the solvent. The residue, the bis(dibutyl phosphate) ester of isopropylidene (2,6,2'6' tetrachlor-)diphenol, weighed 59 g. (78.7% yield). The product is a light amber liquid having a refractive index of 1.5308 at 25° C. which crystallized upon cooling. It analyzed 8.3% P and 19.0% Cl, the same as the theoretical ratios. The crystals have a melting point of 68 to 70° C.

*Example 6*

A mixture of 46 g. (0.201 mol) of di-n-butyl chlorophosphate and 37.8 g. (0.1 mol) of 2-butylidene (tetrachlor-) diphenol were dissolved in 50 cc. of ether. To it was added 22 g. (0.218 mol) of distilled triethylamine in 30 cc. of ether, the temperature being maintained at 35° C. by periodic cooling during the addition, and then heated at reflux (37–38° C.) for one hour to complete the reaction. The mixture was filtered. The filtrate was heated to 50° C. at reduced pressure to remove the ether. The residue, the bis(dibutyl phosphate) ester of 2-butylidene (2,6,2'6' tetrachlor-) diphenol weighed 67.5 g. (88.8% yield). It had a refractive index of 1.5210 at 25° C.

*Example 7*

A mixture of 48.4 g. (0.2 mol) of 2-butylidene diphenol and 70.8 g. (0.2 mol) of diethyl chlorophosphate were dissolved in 75 cc. of ether. There was added 40.4 g. (0.4 mol) of triethylamine dissolved in 50 cc. of ether. The reaction was maintained at 30 to 35° C. while adding the amine. The mixture was then heated to reflux (39–40° C.) for one hour to complete the reaction. It was then filtered to remove the amine salt, and the filtrate was heated under reduced pressure to remove the ether. The liquid residue, the bis(diethyl phosphate) ester of 2-butylidene diphenol, weighed 93.8 g. (91.6% yield) having a refractive index of 1.5115 at 25° C.

*Example 8*

66.7 g. (0.196 mol) of dioctyl chlorophosphate and 22.3 g. (0.98 mol) of isopropylidene diphenol were dissolved in 100 cc. of benzene. To the solution there was added 20 g. (0.198 mol) of triethyl amine dissolved in 50 cc. of benzene. The addition was carried out at 35–37° C. requiring 12 minutes. The mixture was then stirred. After 50 minutes the temperature dropped to 30° C. It was then heated to 50–55° C. for 2 hours in order to complete the reaction. The solid was filtered off and the residue was washed with 50 cc. of 5% NaOH solution and then 3 times with water. Two layers formed. The organic water-insoluble layer was separated and heated to 75° at 1.5 mm. pressure to remove the solvent. The residue, the bis (dioctyl phosphate) ester of isopropylidene diphenol weighed 75 grams (91.5% yield) having a refractive index of 1.4827 at 25° C. The product analyzed 7.5% P compared to the calculated value of 7.42%.

The foregoing detailed description is given for clearness of understanding only and no unnecessary limitations should be understood therefrom as modifications will be obvious to those skilled in the art.

I claim:

1. The new compound: the bis(dialkyl phosphate) ester of an alkylidene diphenol, having the formula

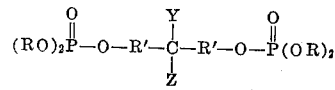

wherein each R is an alkyl group of from 1 to 8 carbon atoms, each R' is a benzene nucleus selected from the group consisting of unsubstituted benzene nuclei and chlorine substituted benzene nuclei, and each of Y and Z is a member of the class consisting of hydrogen atoms and alkyl groups each containing not more than four carbon atoms.

2. The compound of claim 1 wherein each of Y and Z is a methyl group.

3. The compound of claim 1 wherein each R' is an unsubstituted benzene nucleus.

4. The compound of claim 1 where each R' is a benzene nucleus containing from 1 to 2 chlorine substituents.

5. The compound of claim 1 wherein R' is a benzene nucleus containing two chlorine substituents in the positions ortho to the oxygen atom.

6. The new compound: the bis(diethyl phosphate) ester of isopropylidene diphenol, having the formula:

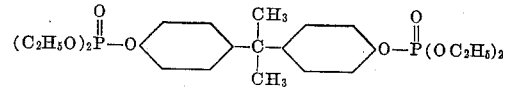

7. The new compound: the bis(dibutyl phosphate) ester of isopropylidene diphenol, having the formula

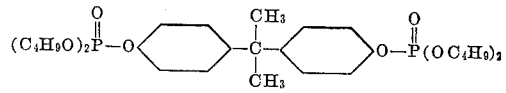

8. The new compound: the bis(diethyl phosphate) ester of 2,6,2'6' tetrachloro-isopropylidene diphenol, having the formula

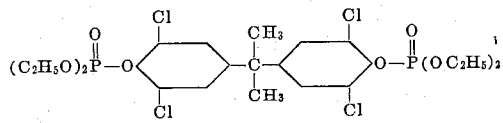

9. The new compound: the bis(diocetyl phosplate) ester of isopropylidene diphenol, having the formula

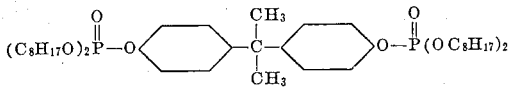

10. The new compound: the bis(diethyl phosphate) ester of 2-butylidene diphenol, having the formula

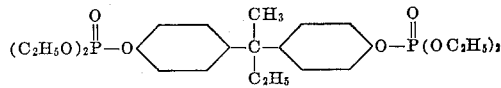

ARTHUR DOCK FON TOY.

References Cited in the file of this patent
UNITED STATES PATENTS

| Number | Name | Date |
|---|---|---|
| 2,490,573 | Atherton et al. | Dec. 6, 1949 |
| 2,520,090 | Barrett | Aug. 22, 1950 |
| 2,520,393 | Fletcher | Aug. 29, 1950 |